Figures 1, 2:
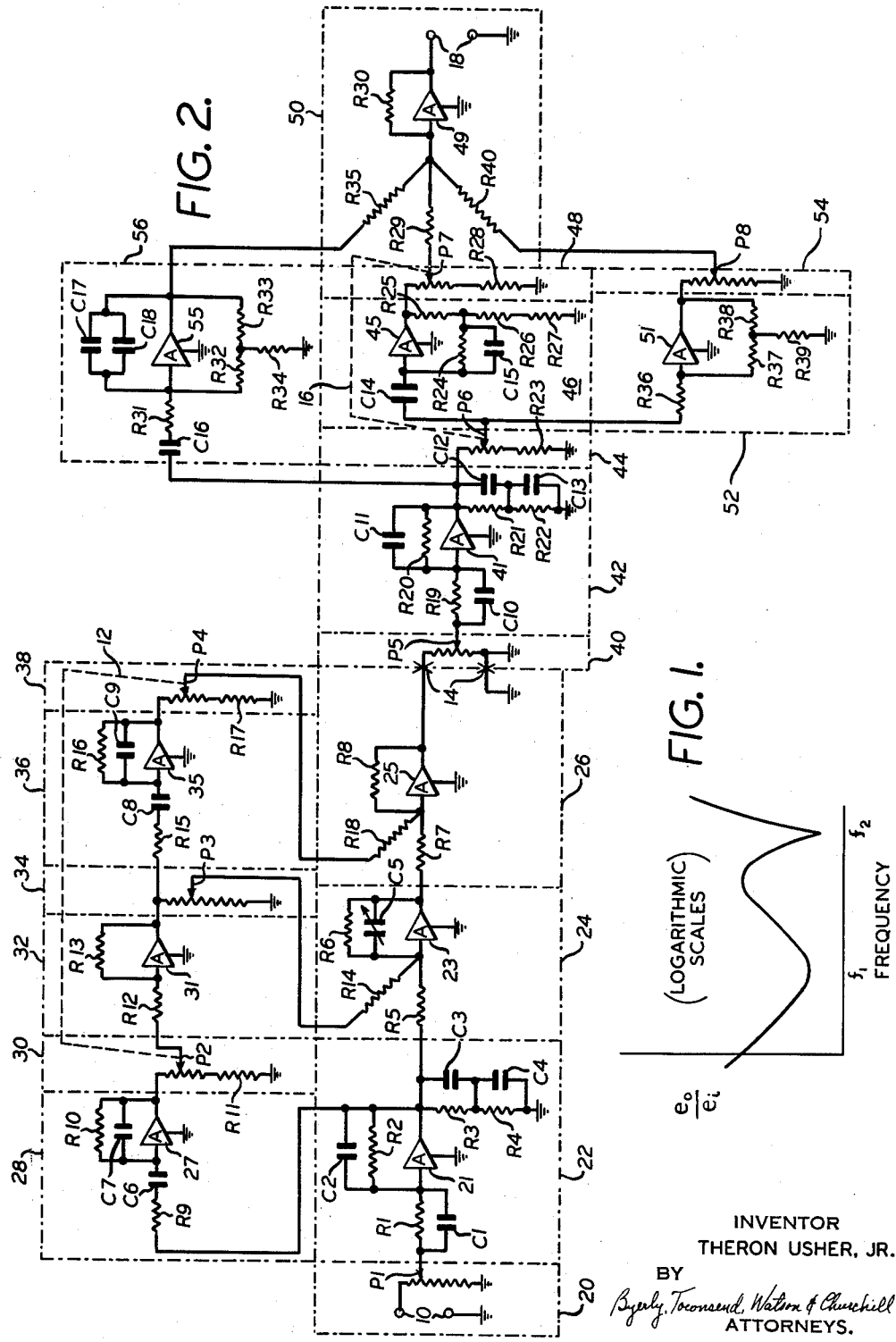

March 20, 1962

T. USHER, JR 3,026,480

EXCITER EQUALIZER

Filed March 10, 1958

INVENTOR
THERON USHER, JR.
BY
Byerly, Townsend, Watson & Churchill
ATTORNEYS.

United States Patent Office 3,026,480
Patented Mar. 20, 1962

3,026,480
EXCITER EQUALIZER
Theron Usher, Jr., New Haven, Conn., assignor to
Textron Electronics, Inc.
Filed Mar. 10, 1958, Ser. No. 720,234
8 Claims. (Cl. 328—127)

The present invention relates to vibration testing equipment or systems and more particularly to an exciter equalizer therefor.

With the advent of vehicles such as pilotless aircraft, missiles, and the like, the need for effective vibration testing of the component parts thereof has become more and more important. Vibration testing equipment is designed to simulate the environmental vibrations which the component will encounter in the vehicle. A typical system includes a test signal source supplying a large power amplifier which controls a vibration exciter provided with a test table. The vibration exciter is a device for converting electrical energy into mechanical vibratory energy. For accurate testing, the accelerations imparted to the specimen by the test table of the vibration exciter must be accurately controlled.

In reproducing vibrational environments one method involves recording on tape the signals generated by a vibration pickup located on the vehicle in which the specimen or component is to be installed. In order to produce table accelerations corresponding to the recorded signals representing the observed environment, a constant ratio between the exciter table acceleration and the input voltage to the system is required throughout the frequency range. Unfortunately, the ratio of table acceleration to exciter input voltage generally is not constant at all frequencies. The vibration exciter is characterized by an electrical resonance caused by a series reaction between the table mass (including the dead load of the specimen) and the electrical inductance of the table driving coil. This resonance appears at frequencies below 200 cycles per second and is a broad slowly varying characteristic inherently well damped. The exciter is also subject to an axial resonance produced by the decoupling action between the moving mass of the table and the coil mass which resonance determines the upper frequency limit of the entire system.

In order to obtain a constant ratio between table acceleration and input voltage, it is necessary to include an exciter equalizer in the circuit between the test signal source and the power amplifier. If the exciter equalizer is provided with the exact inverse frequency characteristic of that characterizing the exciter the compensation will be complete. Actually there are other resonances developed in the system due to the characteristics of the specimen, but these must be compensated by other equipment which does not form a part of the present invention.

In accordance with the present invention there is provided an exciter equalizer having a gain-frequency characteristic which is the exact inverse of the frequency characteristic of a vibration exciter whereby compensation is achieved for both the electrical and axial resonances of the exciter.

The invention will be better understood after reading the following detailed description of one preferred embodiment of the present invention with reference to the appended drawing in which:

FIG. 1 is a logarithmic plot of the ratio of the output to input with respect to frequency of the ideal equalizer; and FIG. 2 is a schematic circuit diagram of an exciter equalizer having the characteristic shown in FIG. 1.

Referring now to the graph of FIG. 1, there is plotted therein to logarithmic scales, the gain-frequency characteristic required of an ideal exciter equalizer. It will be understood that an inversion of the curve will represent the transfer function of the vibration exciter including the dead load of the specimen. Frequency $f_1$ represents the low frequency minimum gain point of the equalizer while frequency $f_2$ represents the high frequency minimum gain point. It will be observed that the response curve in the vicinity of $f_1$ is well damped while the response in the vicinity of $f_2$ shows little damping and high Q.

Referring now to FIG. 2, there is shown schematically a circuit in accordance with the present invention having a gain-frequency characteristic as shown in FIG. 1. A pair of terminals 10 are connected across a potentiometer P1 with the lower terminal grounded. Potentiometer P1 provides a gain control for the equalizer represented by the dot-dash box 20. The slider on potentiometer P1 is connected through the parallel combination of resistor R1 and capacitor C1 to the input of a high gain direct coupled amplifier represented by the symbol A within a triangle and designated by the reference numeral 21. It will be noted that a number of additional amplifiers represented by the same symbol appear in the circuit of FIG. 2. It is to be understood that these amplifiers are all identical. Although not shown in the drawing, it should also be understood that each of the amplifiers are provided with means for applying operating voltages thereto. A typical amplifier which is preferred for use in the present circuit is manufactured by George A. Philbrick, Researches, Inc., of Boston, Massachusetts, and sold under their type designation "K2W." This amplifier contains two twin triodes with one connected to provide a differential amplifier input and the other functioning as voltage amplifier and cathode follower output. As used in the present circuit, the input signals are supplied to the differential section of the amplifier such that the output from the cathode follower is shifted 180° in phase. That is, an input signal to the amplifier is inverted in passing therethrough. Also not shown for each of the amplifiers is a level control determining the bias on the control grid of the reference half of the differential section thereof.

A parallel arrangement of resistor R2 and capacitor C2 is connected between the input of amplifier 21 and its output. Connected between the output of amplifier 21 and ground is a series parallel arrangement of resistors R3 and R4 and capacitors C3 and C4. The circuit thus described in the dot-dash box 22 constitutes an operational amplifier designed to invert the phase of the incoming signal.

The output of amplifier 21 is connected over a first path through resistor R5 to the input of amplifier 23. The output of amplifier 23 is coupled back to its input through resistor R6 and trimmer capacitor C5. A second input to amplifier 23 is supplied from a portion of the circuit to be described below through an input resistor R14. Thus the circuit within the dot-dash box 24 represents an operational amplifier for providing an output signal representative of the sum of the signals received through resistors R5 and R14. As mentioned before, it is to be understood that the signals undergo a phase shift of 180° in passing through amplifier 23.

The output of amplifier 23 is now connected through resistor R7 to the input of amplifier 25. The output of amplifier 25 is connected back through resistor R8 to its input. A second signal as will be described hereinafter is supplied to the input of amplifier 25 through resistor R18. The output of amplifier 25 is also connected across terminals 14 designated symbolically by the symbols "X." The significance of terminals 14 will be explained below. As described, the circuit within the dot-dash box 26 constitutes an operational amplifier for providing an output signal representative of the sum of the signals supplied through resistors R7 and R18. It should be observed that operational amplifiers 24 and 26 are identical except for the trimmer capacitor C5 which introduces some minor phase correction. These amplifier circuits may be referred to as a first and second summing amplifier, respectively.

Returning now to the output of amplifier 21, it will be seen that there is a second connection through resistor R9 and capacitor C6 in series to the input of amplifier 27. Resistor R10 and shunt capacitor C7 represent a feedback circuit between the output and input of amplifier 27. In this circuit, capacitor C6 and resistor R10 are proportioned such that the output of amplifier 27 represents the differential of the signal supplied to resistor R9. In other words, the elements just described constitute an operational amplifier within the dot-dash box 28 for preforming the function of differentiation. The resistor R9 and capacitor C7 are included to suppress parasitic oscillation. As with the previous operational amplifiers, the circuit 28 introduces a phase shift of 180° due to inversion in amplifier 27 plus an additional shift of 90° implicit in the differentiation.

The output of amplifier 27 is connected across a potentiometer P2 and resistor R11 in series. These elements constitute a portion of the frequency control for the part of the circuit now being described. They are shown enclosed within the dot-dash box 30.

The slider of potentiometer P2 is connected to a further operational amplifier shown within the dot-dash box 32. Thus, slider P2 is connected through resistor R12 to the input of amplifier 31. The output of amplifier 31 is connected back to its input through resistor R13. By suitably proportioning resistors R12 and R13, this circuit functions merely to invert the signal received from potentiometer P2.

The output of amplifier 31 is connected over a first path to a potentiometer P3 which constitutes a damping control within the box 34. The slider of potentiometer P3 is connected to resistor R14 to provide a signal mentioned hereinafter in describing operational amplifier 24.

Over a second path the output of amplifier 31 is connected through resistor R15 and capacitor C8 in series to the input of amplifier 35. The output of amplifier 35 is connected back to its input through resistor R16 and capacitor C9 in parallel. The components just described within the dot-dash box 36 are identical to those found in operational amplifier 28 and thus provide a second differentiating circuit.

The output of amplifier 35 is connected to potentiometer P4 in series with resistor R17. The slider of potentiometer P4 is ganged by the link 12 with the slider of potentiometer P2 and constitutes, therewith, a frequency adjustment for the high frequency notch appearing at $f_2$ in FIG. 1. Potentiometer P4 and resistor R17 are shown within the box 38. The slider of potentiometer P4 is connected electrically to resistor R18 to provide a signal previously described.

The elements of the circuit in FIG. 2 which have been described up to this point will be seen to constitute a complete unit between terminals 10 and 14. As such, this unit provides a high Q notch characteristic required in the region of frequency $f_2$. As mentioned, ganged controls 30 and 38 adjust the frequency at which the high frequency notch occurs while control 34 (potentiometer P3) determines the damping in the region of the high frequency notch.

The low frequency response of the equalizer is obtained by the circuitry to the right of terminals 14 as seen in the drawing. Terminals 14 are connected across a potentiometer P5 which constitutes a separate gain control for the section now being described. For convenience, it is shown within the dot-dash box 40.

The slider on potentiometer P5 is connected to an operational amplifier shown within the dot-dash box 42. This operational amplifier is the same as operational amplifier 22 previously described and consists of resistors R19, R20, R21 and R22, capacitors C10, C11, C12 and C13, and amplifier 41.

The output of amplifier 41 is connected over a first path to potentiometer P6 and resistor R23 in series. These elements in box 44 form a portion of the frequency control for this section.

The slider of potentiometer P6 is connected through a capacitor C14 to the input of amplifier 45. The output of amplifier 45 is connected across resistors R25, R26 and R27 in series, with the junction between R25 and R26 connected back to the amplifier input through resistor R24 in parallel with capacitor C15. This constitutes an operational amplifier within the box 46 for performing differentiation.

The output of amplifier 45 is connected across, via a second path, the potentiometer P7 and resistor R28 in series. As shown, the slider of potentiometer P7 is ganged by the mechanical link 16 with the slider of potentiometer P6 and provides therewith the means for adjusting frequency $f_1$. Elements P7 and R26 are shown within the box 48.

The slider of potentiometer P7 is connected through resistor R29 to the input of amplifier 49. The output of amplifier 49 is connected back to its input through resistor R30. Two additional inputs are supplied to amplifier 49 in a manner to be described through resistors R35 and R40. Thus the elements within the dot-dash box 50 constitute a summing amplifier or operational amplifier for providing a signal at the output terminals 18 representative of the sum of the three signals supplied to its input.

Returning now to the output of amplifier 41, it will be seen that there is a second path connecting it through capacitor C16 and resistor R31 in series to the input of amplifier 55. A feedback network from the output of amplifier 55 to its input is formed by capacitors C17 and C18 and resistors R32, R33 and R34 connected as shown in the drawing. This circuit within the box 56 is arranged to function as an operational amplifier performing integration. The integrated output from amplifier 55 is connected to resistor R35.

Now referring to the slider on potentiometer P6 a further connection will be found through resistor R36 to the input of amplifier 51. The output of amplifier 51 is connected across resistors R38 and R39 in series with the junction therebetween connected back to the input of the amplifier through resistor R37. These elements in the dot-dash box 52 constitute an operational amplifier for inverting the signals supplied thereto.

The output of amplifier 51 is also connected across the potentiometer P8. The slider of potentiometer P8 is connected to resistor R40. Potentiometer P8 included in box 54 represents the adjustment for controlling the damping in the vicinity of frequency $f_1$.

It should be understood that the various potentiometers can be referred to as varable attenuators.

As an aid to the fabrication of a typical exciter equalizer, there is furnished hereinafter, a table providing typical values for all of the components. It is to be understood, however, that all of the circuit constants may be varied depending upon the range of frequency to be covered and the general character of the response desired.

RESISTORS

| | |
|---|---|
| R1—1M | R11—100K |
| R2—1M | R12—1M |
| R3—1M | R13—1M |
| R4—120K | R14—1M |
| R5—1M | R15—10K |
| R6—1M | R16—220K |
| R7—1M | R17—100K |
| R8—1M | R18—1M |
| R9—10K | R19—1M |
| R10—220K | R20—1M |

RESISTORS

| | |
|---|---|
| R21—1M | R31—100K |
| R22—120K | R32—1M |
| R23—10K | R33—220K |
| R24—2M | R34—56K |
| R25—470K | R35—1M |
| R26—470K | R36—1M |
| R27—150K | R37—1M |
| R28—100K | R38—470K |
| R29—1M | R39—100K |
| R30—1M | R40—1M |

POTENTIOMETERS

| | |
|---|---|
| P1—100K | P5—500K |
| P2—500K | P6—50K |
| P3—500K | P7—500K |
| P4—500K | P8—500K |

CAPACITORS

| | |
|---|---|
| C1—100 | C10—100 |
| C2—100 | C11—100 |
| C3—100 | C12—100 |
| C4—820 | C13—820 |
| C5—9–180 | C14—1000 |
| C6—1000 | C15—10 |
| C7—50 | C16—2 mfd. |
| C8—1000 | C17—.02 mfd. |
| C9—50 | C18—.02 mfd. |

In the above table, K represents $\times 10^3$ and M represents $\times 10^6$. All capacities are in micromicrofarads unless otherwise noted.

What I claim is:

1. An exciter equalizer comprising a pair of input terminals for receiving a test signal, first circuit means coupled to said terminals for differentiating said test signal to provide a second signal, second circuit means coupled to both said first means and said terminals for providing a third signal representive of the sum of said test and second signals, third circuit means coupled to said first means for differentiating said second signal to provide a fourth signal, fourth circuit means coupled to both said second and third means for providing a fifth signal representative of the sum of said third and fourth signals, fifth and sixth circuit means each coupled to said fourth means for integrating and differentiating, respectively, said fifth signal to provide a sixth and seventh signal, respectively, and seventh circuit means coupled to said fourth, fifth and sixth means for providing an output signal representative of the sum of said fifth, sixth and seventh signals.

2. An exciter equalizer according to claim 1, wherein each of said circuit means one through seven comprises an operational amplifier including a direct current high gain electronic amplifier and a negative feedback network.

3. An exciter equalizer according to claim 1, wherein said first and third circuit means each comprise a variable signal attenuator, said attenuators being ganged for simultaneous operation to adjust the frequency at which the high frequency notch in the gain characteristic occurs.

4. An exciter equalizer according to claim 1, wherein the coupling between said first and second circuit means includes a variable attenuator for adjusting the damping at the frequency at which the high frequency notch in the gain characteristic occurs.

5. An exciter equalizer according to claim 1, wherein the coupling between said sixth and seventh circuit means includes a first variable attenuator, and wherein a second variable attenuator is included in the couplings between said fourth circuit means and said sixth and seventh circuit means common to both, said first and second attenuators being ganged together for simultaneous operation to adjust the frequency at which the low frequency notch in the gain characteristic occurs.

6. An exciter equalizer according to claim 1, wherein a variable attenuator is included in the coupling between said fourth and seventh circuit means to independently control the magnitude of the fifth signal supplied to said seventh circuit means whereby the damping can be adjusted at the frequency at which the low frequency notch in the gain characteristic occurs.

7. An equalizer circuit for an exciter equalizer for determining the low frequency characteristic thereof comprising a pair of input terminals, an integrating circuit having an input coupled to said terminals and having an output, a first variable attenuator, a differentiating circuit having an input coupled through said first attenuator to said terminals and having an output, a second variable attenuator, and a summing circuit having three inputs coupled respectively to the outputs of said integrating and differentiating circuits and to said terminals, the coupling to the output of the differentiating circuit being through said second attenuator, said summing circuit having an output which is the output for the equalizer circuit, and said attenuators being mechanically ganged for joint adjustment.

8. An equalizer circuit for an exciter equalizer for determining the high frequency characteristic thereof comprising a pair of input terminals, a first differentiating circuit having an input coupled to said terminals and having an output, a second differentiating circuit having an input coupled to the output of said first differentiating circuit and having an output, a first summing circuit having two inputs coupled respectively to said terminals and to the output of said first differentiating circuit and having an output, and a second summing circuit having two inputs coupled respectively to the output of said second differentiating circuit and to the output of said first summing circuit and having an output which is the output for the equalizer circuit.

References Cited in the file of this patent

UNITED STATES PATENTS

| | | |
|---|---|---|
| 2,703,203 | Bishop | Mar. 1, 1955 |
| 2,895,111 | Rothe | July 14, 1955 |
| 2,946,943 | Nye et al. | July 26, 1960 |

FOREIGN PATENTS

| | | |
|---|---|---|
| 646,354 | Great Britain | Nov. 22, 1950 |

OTHER REFERENCES

Samuel and Seely, "Electron Tube Circuits," McGraw-Hill, 1958, pp. 246–281.